United States Patent
Tsirkin et al.

(10) Patent No.: US 9,940,167 B2
(45) Date of Patent: Apr. 10, 2018

(54) IDENTIFYING MEMORY DEVICES FOR SWAPPING VIRTUAL MACHINE MEMORY PAGES

(71) Applicant: Red Hat Israel, Ltd., Raanana (IL)

(72) Inventors: Michael Tsirkin, Yokeneam Yillit (IL); Andrea Arcangeli, Imola (IT)

(73) Assignee: Red Hat Israel, Ltd., Raanana (IL)

( * ) Notice: Subject to any disclaimer, the term of this patent is extended or adjusted under 35 U.S.C. 154(b) by 189 days.

(21) Appl. No.: 14/281,995

(22) Filed: May 20, 2014

(65) Prior Publication Data

US 2015/0339165 A1   Nov. 26, 2015

(51) Int. Cl.
*G06F 9/455* (2006.01)
*G06F 9/50* (2006.01)

(52) U.S. Cl.
CPC ............ *G06F 9/5016* (2013.01); *G06F 9/455* (2013.01); *G06F 9/45558* (2013.01); *G06F 9/50* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 7,302,514 B2 | 11/2007 | Ouriel et al. | |
| 7,805,726 B1* | 9/2010 | Leonard | G06F 11/3476 718/104 |
| 8,230,069 B2 | 7/2012 | Korupolu | |
| 8,301,859 B2 | 10/2012 | Heim | |
| 2004/0199734 A1* | 10/2004 | Rajamani | G06F 9/524 711/163 |
| 2007/0233707 A1* | 10/2007 | Osmond | G06F 17/2264 |
| 2007/0271560 A1 | 11/2007 | Wahlert et al. | |
| 2009/0150641 A1* | 6/2009 | Flynn | G06F 3/061 711/202 |
| 2010/0064144 A1* | 3/2010 | Kaabouch | G06F 21/85 713/190 |
| 2010/0250868 A1* | 9/2010 | Oshins | G06F 12/0284 711/154 |
| 2010/0269110 A1* | 10/2010 | Leijen | G06F 9/505 718/100 |
| 2011/0022870 A1 | 1/2011 | McGrane et al. | |
| 2012/0137066 A1* | 5/2012 | Nolterieke | G06F 3/061 711/114 |

(Continued)

OTHER PUBLICATIONS

Gulati, Ajay, Kumar, Chethan, and Ahmad, Irfan, "Modeling Workloads and Devices for IO Load Balancing in Virtualized Environments", VMware Inc., 2009 8 pages http://www.sigmetrics.org/conferences/sigmetrics/2009/workshops/papers_hotmetrics/session3_2.pdf.

(Continued)

*Primary Examiner* — Wynuel Aquino
(74) *Attorney, Agent, or Firm* — Lowenstein Sandler LLP

(57) ABSTRACT

Systems and methods for identifying memory devices for swapping virtual machine memory pages. An example method may comprise: determining a workload type associated with a workload being executed by a virtual machine running on a computer system; identifying a memory device associated with the workload type; and allocating a memory block on the identified memory device for swapping memory pages of the virtual machine.

20 Claims, 5 Drawing Sheets

(56) References Cited

U.S. PATENT DOCUMENTS

| | | | | |
|---|---|---|---|---|
| 2012/0137295 | A1* | 5/2012 | Soetemans | G06F 9/524 718/100 |
| 2012/0167082 | A1 | 6/2012 | Kumar et al. | |
| 2012/0179846 | A1* | 7/2012 | Haustein | G06F 3/061 710/38 |
| 2012/0185426 | A1* | 7/2012 | Mori | G06F 3/061 707/609 |
| 2012/0271868 | A1* | 10/2012 | Fukatani | G06F 3/0608 707/822 |
| 2013/0055252 | A1 | 2/2013 | Lagar-Cavilla et al. | |
| 2013/0132663 | A1* | 5/2013 | Eleftheriou | G06F 12/0866 711/111 |
| 2013/0205106 | A1* | 8/2013 | Tati | G06F 3/061 711/159 |
| 2014/0033212 | A1* | 1/2014 | Balasubramaniam | G06F 9/5038 718/102 |
| 2014/0196030 | A1* | 7/2014 | Deshpande | G06F 9/45558 718/1 |

OTHER PUBLICATIONS

Park, Kyu Ho, Park, Youngwoo, Hwang, Woomin, and Park, Ki-Woong, "MN-Mate: Resource Management of Manycores with DRAM and Nonvolatile Memories", 2010 12th IEEE International Conference on High Performance Computing and Communications, IEEE Computer Society, pp. 24-34 http://core.kaist.ac.kr/paper_list/2010_hpcc_khpark.pdf.

"Performance Best Practices for VMware vSphere 5.1", VMware, Inc., 2007-2012, pp. 1-84 https://www.vmware.com/pdf/Perf_Best_Practices_vSphere5.1.pdf.

Williams, Dan, Weatherspoon, Hakim, Jamjoom, Hani, and Liu, Yew-Huey, "Overdriver: Handling Memory Overload in an Oversubscribed Cloud", Virtual Execution Environments (VEE), Mar. 9-11, 2011, Newport Beach, CA http://citeseerx.ist.psu.edu/viewdoc/download?doi=10.1.1.188.4568&rep=rep1&type=pdf.

\* cited by examiner

IDENTIFYING MEMORY DEVICES FOR SWAPPING VIRTUAL MACHINE MEMORY PAGES

TECHNICAL FIELD

The present disclosure is generally related to distributed computer systems, and is more specifically related to systems and methods for identifying memory devices for swapping virtual machine memory pages.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
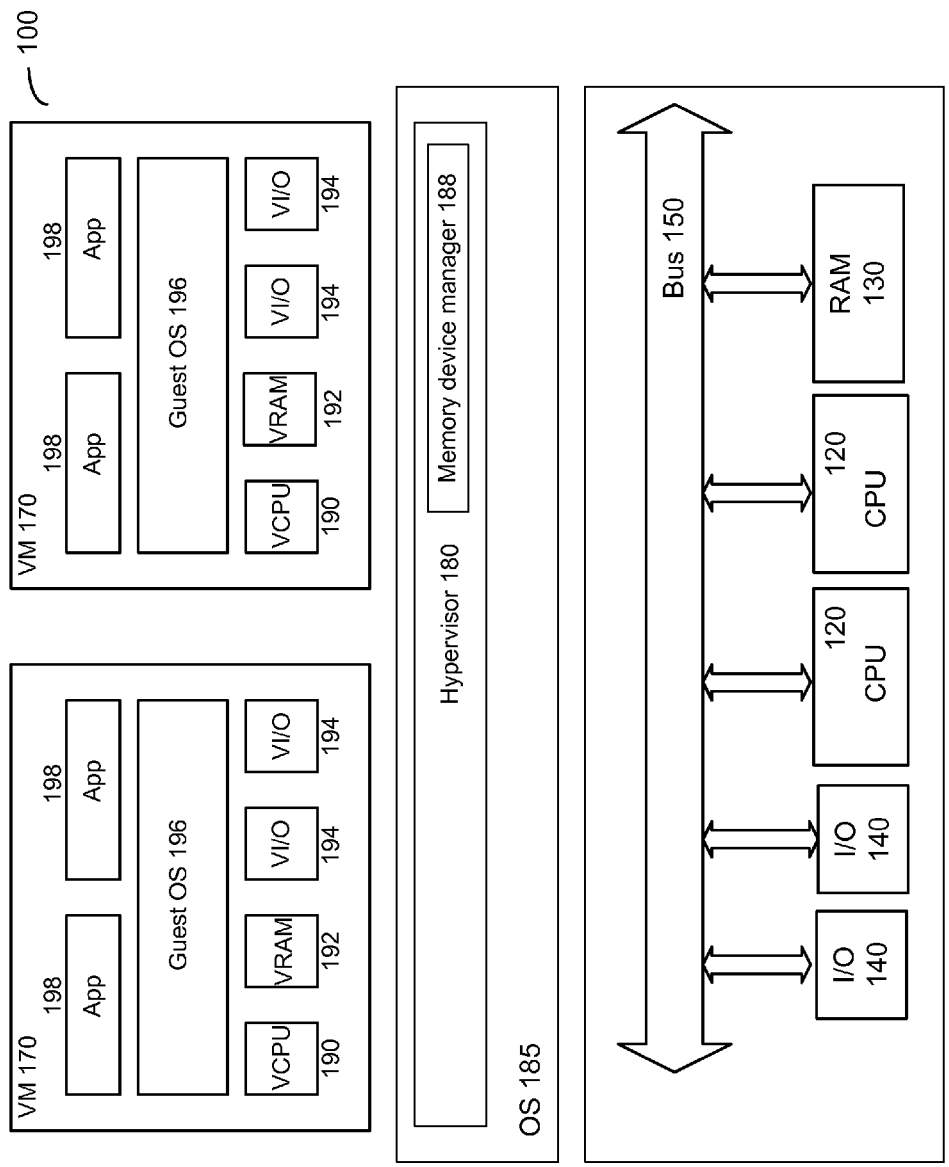
FIG. 1 depicts a high-level component diagram of an example computer system, in accordance with one or more aspects of the present disclosure.

Described herein are methods and systems for identifying memory devices for swapping virtual machine memory pages.

A host computer system may support a virtual memory environment in which a virtual machine address space is simulated with a smaller amount of the host random access memory (RAM) and a backing store (e.g., a file on a disk or a raw storage device), thus allowing the host to over-commit the memory. The virtual machine memory space may be divided into memory pages which may be allocated in the host RAM and swapped to the backing store when necessary. The guest operating system may maintain a page directory and a set of page tables to keep track of the memory pages. When a virtual machine attempts to access a memory page, it may use the page directory and page tables to translate the virtual address into a physical address. If the page being accessed is not currently in the host RAM, a page-fault exception may be generated, responsive to which the host computer system may read the page from the backing store and continue executing the virtual machine that caused the exception.

In certain implementations, various memory devices may be used to implement the backing store, including, e.g., memory devices that store transformed memory pages. "Transformed memory page" herein shall refer to a memory page to which a transformation function has been applied. Examples of transformation functions include compression, encryption, and/or encoding. For each transformation function, a corresponding reverse transformation function may be defined (e.g., de-compression, decryption, and/or decoding).

Aspects of the present disclosure improve the virtual machine efficiency and/or other operational aspects by providing a method for automatically, based on the virtual machine workload type, identifying memory devices for swapping virtual machine memory pages.

"Workload" herein shall refer to one or more applications being executed by a virtual machine. "Workload type" shall refer to a classification of software applications based on a certain set of criteria (e.g., based on the type of data being consumed and/or produced by applications). In certain implementations, the workload type can be specified as a virtual machine configuration parameter. Alternatively, the workload type can be determined at runtime based on the runtime values of certain operating system and/or application parameters.

In certain implementations, a host computer system may comprise a memory device manager configured to designate a memory device for providing a backing store for swapping memory pages of a virtual machine running on the host computer system, based on the type of workload being executed by the virtual machine. The memory device manager may maintain a memory data structure comprising a plurality of records mapping memory device type identifiers to workload type identifiers. The memory device manager may identify the memory device type corresponding to the type of workload being handled by the virtual machine, and then identify a memory device of the requisite type to act as the backing store for swapping memory pages of the virtual machine. In certain implementations, if the current host does not support a memory device of a type identified by the memory device manager, the affected virtual machine may be migrated to another host which has a memory device of the requisite type.

Various aspects of the above referenced methods and systems are described in details herein below by way of examples, rather than by way of limitation.

FIG. 1 depicts a high-level component diagram of an illustrative example of a host computer system 100 that may be operated to identify memory devices for swapping virtual machine memory pages, in accordance with one or more aspects of the present disclosure. Host computer system 100 may comprise one or more processors 120 communicatively coupled to memory devices 130 and input/output (I/O) devices 140 via a system bus 150.

"Processor" or "processing device" herein refers to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

Host computer system 100 may run multiple virtual machines 170, by executing a software layer 180, often referred to as "hypervisor," above the hardware and below the virtual machines, as schematically illustrated by FIG. 1. In one illustrative example, hypervisor 180 may be a component of an operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors, memory, and I/O devices, and present this abstraction to virtual machines 170 as virtual devices. A virtual machine 170 may execute a guest operating system 196 which may utilize underlying virtual processors 190, virtual memory 192, and virtual I/O devices 194. One or more applications 198 may be running on virtual machine 170 under guest operating system 196.

A host computer system may support a virtual memory environment in which a virtual machine address space is simulated with a smaller amount of the host random access memory (RAM) and a backing store (e.g., a file on a disk or a raw storage device), thus allowing the host to over-commit the memory. The virtual machine memory space may be divided into memory pages which may be allocated in the host RAM and swapped to the backing store when necessary. The guest operating system may maintain a page directory and a set of page tables to keep track of the memory pages. When a virtual machine attempts to access a memory page, it may use the page directory and page tables to translate the virtual address into a physical address. If the page being accessed is not currently in the host RAM, a page-fault exception may be generated, responsive to which the host computer system may read the page from the backing store and continue executing the virtual machine that caused the exception.

Figure 2:
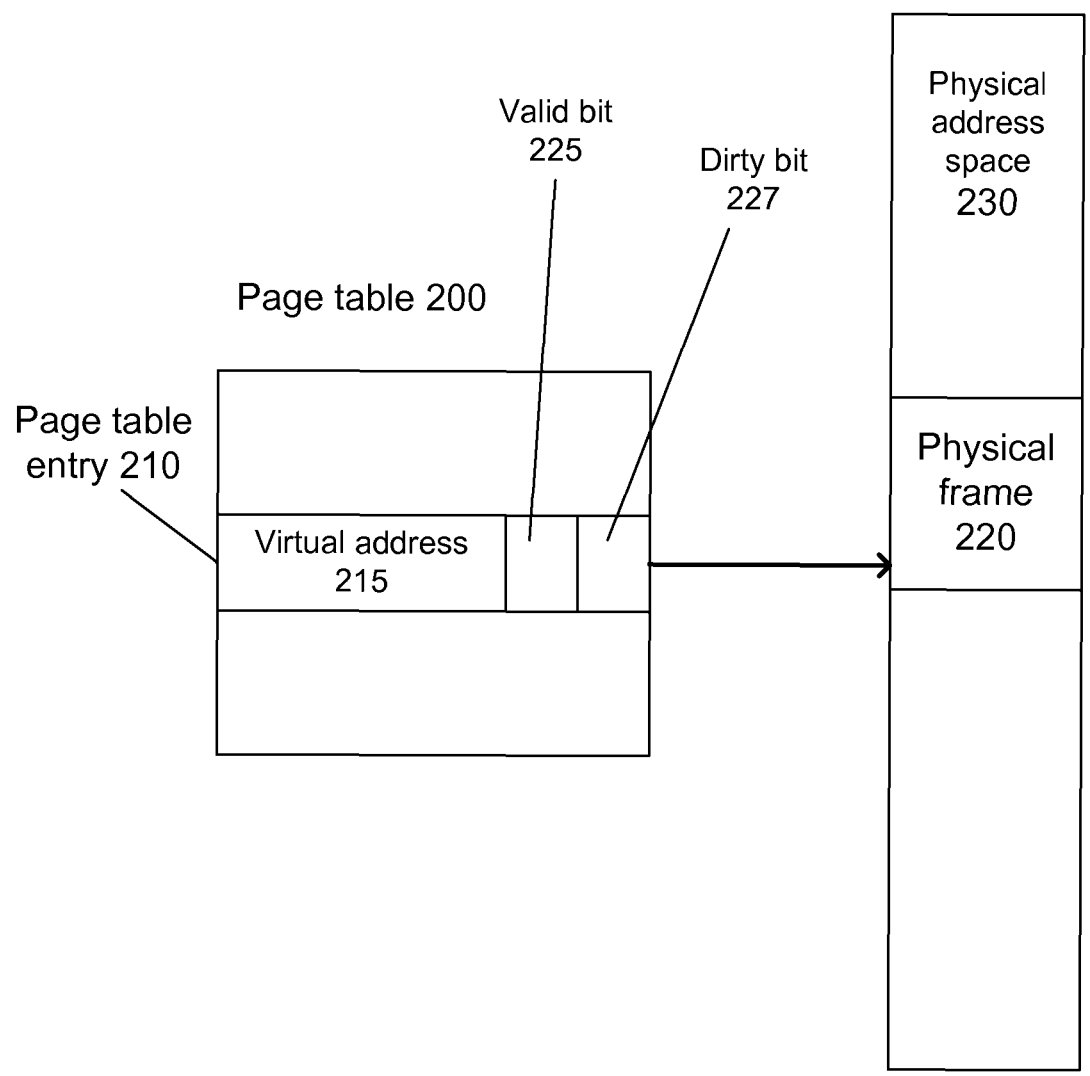
FIG. 2 schematically illustrates an example page table for mapping virtual addresses to physical memory frame addresses, in accordance with one or more aspects of the present disclosure.

"Page table" herein shall refer to a memory data structure facilitating translation of virtual memory addresses to physical memory addresses. FIG. 2 schematically illustrates an example page table for mapping virtual addresses to physical memory frame addresses, in accordance with one or more aspects of the present disclosure. Referring to FIG. 2, page table 200 maintained by host computer system 100 may include a plurality of page table entries 210 corresponding to a plurality of memory pages mapped into the virtual address space of virtual machines 170 hosted by computer system 100 of FIG. 1. Each page table entry 210 may represent a mapping of a virtual address 215 of a memory page to the physical address of a corresponding physical frame 220 in the physical address space 230. Each page table entry may further comprise a valid bit 225 indicating whether the memory page is currently present in the physical memory frame referenced by the corresponding page table entry. Each page table entry may further comprise a dirty bit 227 indicating whether the memory page has been written to after having been paged in from the backing store. If the dirty bit is set, the memory page needs to be synchronized with the corresponding physical frame the backing store. The synchronization process may also be referred to as "page laundering."

In certain implementations, various memory devices may be used to implement the backing store, including, e.g., memory devices that store transformed (e.g., encrypted and/or compressed) memory pages. In accordance with one or more aspects of the present disclosure, host computer system 100 of FIG. 1 may comprise a memory device manager 188 programmed to designate a memory device for providing a backing store for swapping memory pages of a virtual machine running on the host computer system, based on the type of workload being executed by the virtual machine, in order to improve the virtual machine efficiency and/or other operational aspects.

In an illustrative example, memory device manager 188 may be executed within the context of the hypervisor of the host computer system. Alternatively, memory device manager 188 may be implemented as a software module external to the hypervisor.

In certain implementations, the workload type can be specified as a virtual machine configuration parameter. Alternatively, the workload type can be determined, by memory device manager 188 and/or other hypervisor or guest OS components, at runtime based on the runtime values of certain operating system and/or application parameters.

Figure 3:
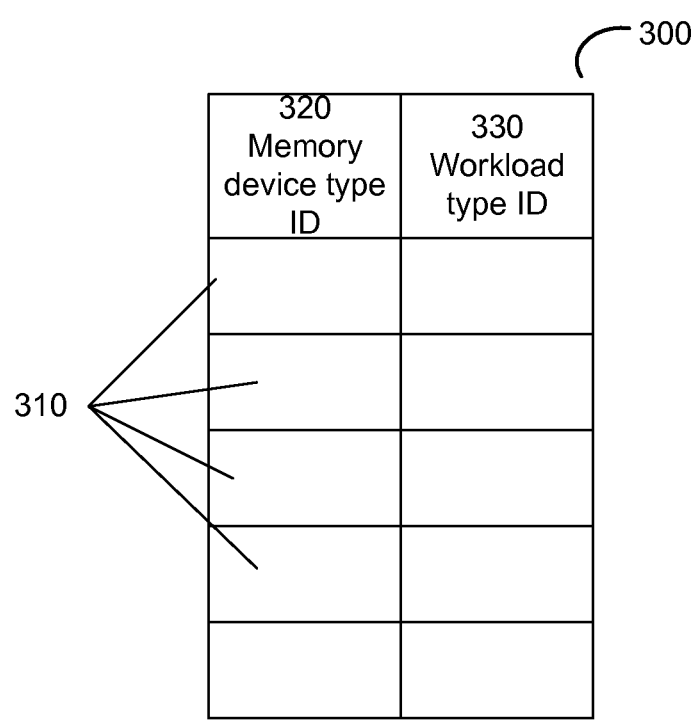
FIG. 3 schematically illustrates an example memory data structure for mapping virtual machine workload types to memory device types, in accordance with one or more aspects of the present disclosure.

FIG. 3 schematically illustrates an example memory data structure for mapping virtual machine workload types to memory device types, in accordance with one or more aspects of the present disclosure. Referring to FIG. 3, the memory device manager may maintain a memory data structure 300 comprising a plurality of records 310 mapping memory device type identifiers 320 to workload type identifiers 330. Memory device manager 188 may identify the memory device type corresponding to the type of workload being handled by a particular virtual machine, and then identify a memory device of the requisite type to act as the backing store for the virtual machine. In certain implementations, if the current host computer system does not support a memory device of the identified type, memory device manager 188 may cause the virtual machine to be migrated, using a live migration technique, to another host which has an available memory device of the requisite type. "Live migration" herein shall refer to the process of moving a running virtual machine from an origin host computer system to a destination host computer system without disrupting the guest operating system and the applications executed by the virtual machine.

In certain implementations, memory device manager 188 may perform the allocation of one or more memory blocks on the identified memory device responsive to detecting a memory pressure condition in host computer system 100. Alternatively, memory device manager 188 may perform the allocation of one or more memory blocks on the identified memory device at any time within the virtual machine life cycle (such a memory allocation operation may be referred to as "reservation").

The memory pressure in a computer system may be measured by one or more metrics. In an illustrative example, the memory pressure metric may comprise the difference between a pre-defined value and the amount of available physical memory. In another illustrative example, the memory pressure metric may comprise the number of memory page faults within a unit of time. In another illustrative example, the memory pressure metric may comprise a period of time during which an application being executed by the computer system has been blocked by a memory allocation operation. The memory pressure condition may be detected responsive to determining that a memory pressure metric exceeds a certain threshold value.

The mappings of memory device types to workload types may be designed to improve the efficiency of application execution by the virtual machine and/or improve other operational aspects (e.g., application and data security) of the virtual machine. In an illustrative example, for a virtual machine executing a workload handling video and/or audio-stream data, the memory device manager may designate an uncompressed memory device, as the video and/or audio-stream formats usually call for some type of compression. Conversely, for a virtual machine executing a workload handling uncompressed data, the memory device manager may designate a compressed memory device. In another illustrative example, for a virtual machine executing a workload handling security-sensitive data (e.g., unencrypted video and/or audio-stream data protected by various Digital Rights Management (DRM) schemes), the memory device manager may designate an encrypted memory device. In another illustrative example, for a virtual machine executing a workload handling huge memory pages, the memory device manager may designate a huge page memory device.

Figure 4:
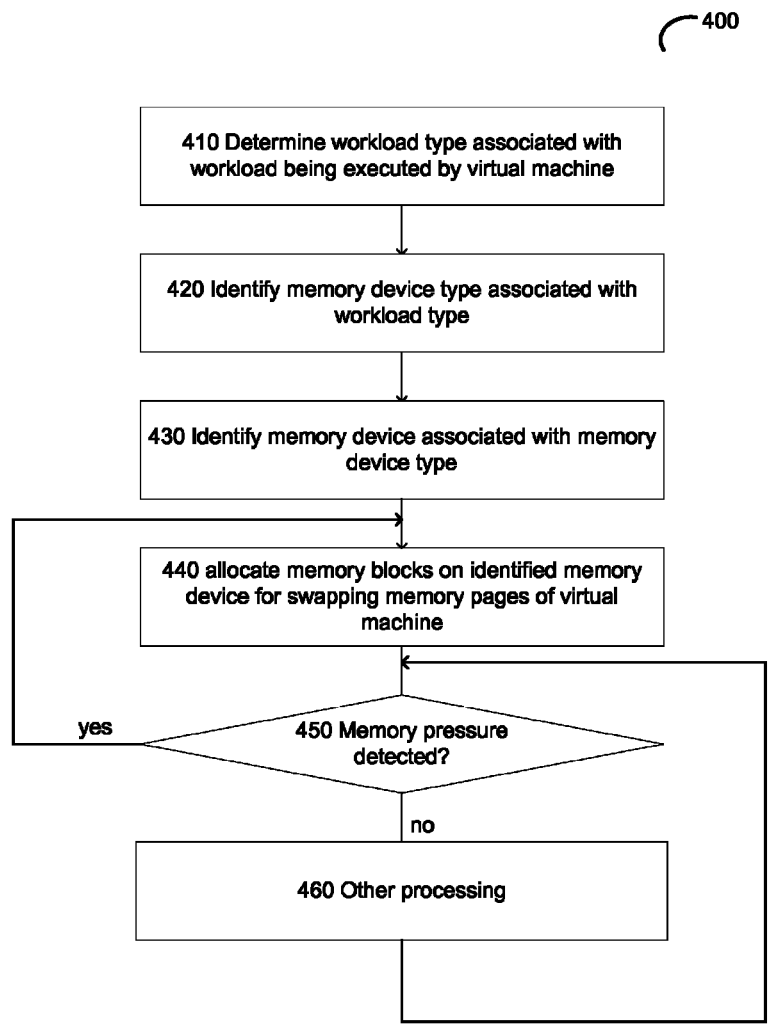
FIG. 4 depicts a flow diagram of an example method for identifying memory devices for swapping virtual machine memory pages, in accordance with one or more aspects of the present disclosure.

FIG. 4 depicts a flow diagram of an example method 400 for identifying memory devices for swapping virtual machine memory pages, in accordance with one or more aspects of the present disclosure. Method 400 may be performed by a computer system that may comprise hardware (e.g., circuitry, dedicated logic, and/or programmable logic), software (e.g., instructions executable on a computer system to perform hardware simulation), or a combination thereof. Method 400 and/or each of its individual functions, routines, subroutines, or operations may be performed by one or more processors of the computer system executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a memory device manager of the computer system implementing the method may determine a workload type associated with a workload being executed by a virtual machine running on the computer system. As noted herein above, the workload type can be specified as a virtual machine configuration parameter. Alternatively, the workload type can be determined, by the memory device manager and/or other hypervisor or guest OS components, at runtime based on the runtime values of certain operating system and/or application parameters.

At block 420, the memory device manager may identify a memory device type associated with the workload type. In certain implementations, the memory device manager may employ a memory data structure comprising a plurality of records mapping memory device type identifiers to workload type identifiers, as described in more details herein above.

At block 430, the memory device manager may identify a memory device associated with the memory device type. In various illustrative examples, the identified memory device may be designed to store transformed (e.g., encrypted and/or compressed) memory pages. In various illustrative examples, the identified memory device may be provided by a file storage device or a raw storage device.

At block 440, the memory device manager may allocate one or more memory blocks on the identified memory device for swapping memory pages of the virtual machine. In certain implementations, the memory device manager may perform the allocation of one or more memory blocks on the identified memory device responsive to detecting a memory pressure condition in the host computer system, as described in more details herein above. Alternatively, the memory device manager may perform the allocation of one or more memory blocks on the identified memory device at any time within the virtual machine life cycle.

Responsive to determining, at block 450, that a memory pressure condition has been detected in the host computer system, the method may loop back to block 440 for allocating one or more memory blocks on the identified memory device.

Figure 5:
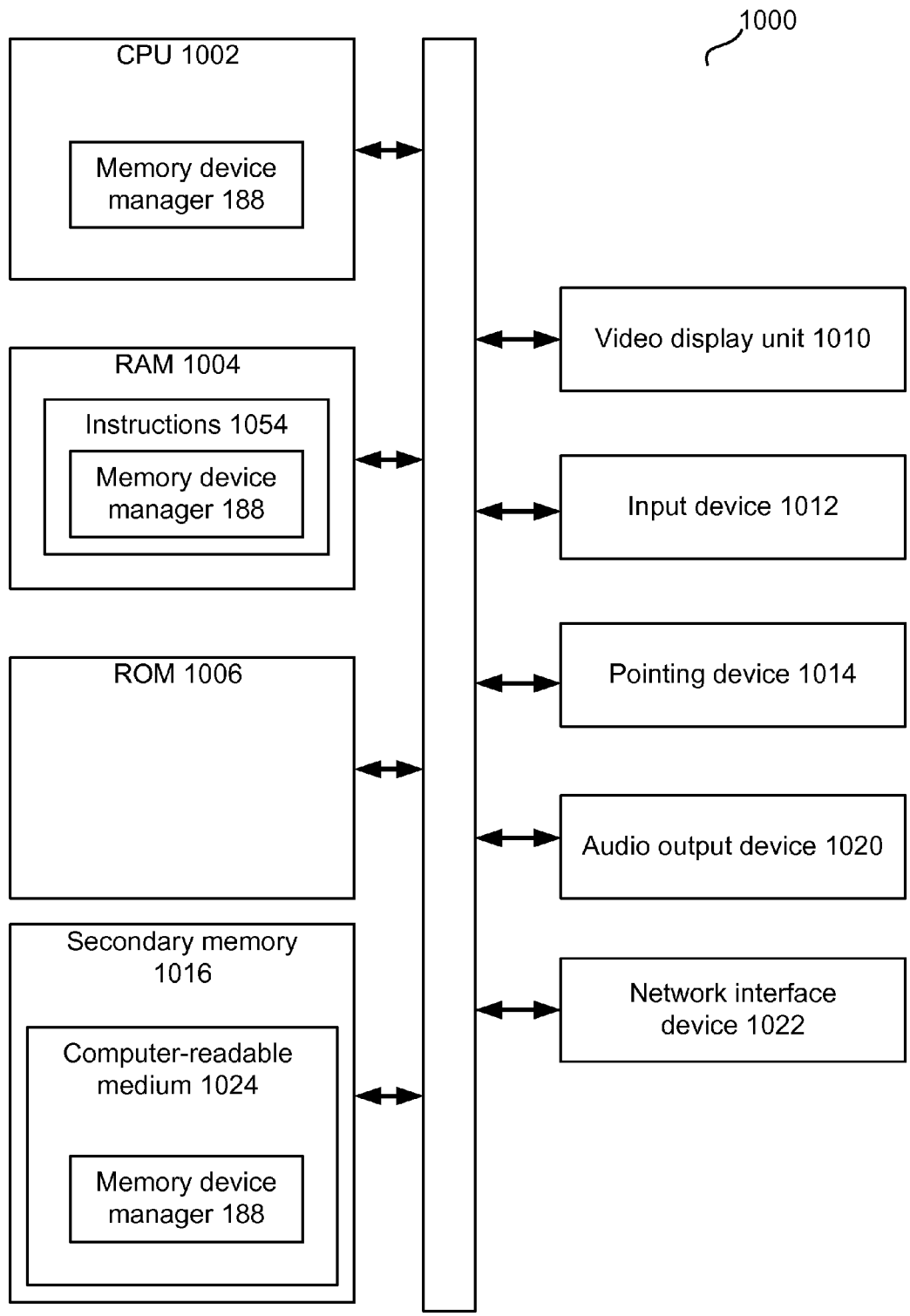
FIG. 5 depicts a block diagram of an illustrative computer system operating in accordance with examples of the invention.

FIG. 5 depicts an example computer system 1000 which can perform any one or more of the methods described herein. In one example, computer system 1000 may correspond to computer system 100 of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface controller 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may include a non-transitory computer-readable storage medium 1024 on which may be stored instructions 1054 encoding any one or more of the methods or functions described herein, including instructions encoding memory device manager 188 of FIG. 1 implementing method 400 for identifying memory devices for swapping virtual machine memory pages.

Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method, comprising:
   determining a workload type associated with a workload being executed by a virtual machine running on a computer system;
   identifying, by a processing device, using a memory data structure comprising a plurality of records mapping memory device type identifiers to workload type identifiers, a memory device type associated with the workload type;
   identifying, by the processing device, a memory device associated with the memory device type;
   evaluating a memory pressure metric reflecting a period of time during which an application being executed by the computer system has been blocked by a memory allocation operation;
   responsive to determining that the memory pressure metric exceeds a threshold value, allocating a memory block on the identified memory device; and
   swapping memory pages of the virtual machine with the allocated memory block.

2. The method of claim 1, wherein the workload comprises an application being executed by the virtual machine.

3. The method of claim 1, wherein allocating the memory block is performed within an initialization sequence of the virtual machine.

4. The method of claim 1, further comprising:
   identifying a second computer system associated with the memory device; and
   causing the virtual machine to be migrated to the second computer system.

5. The method of claim 1, further comprising:
   responsive to determining that the workload type has changed to a second workload type, identifying a second memory device associated with the second workload type; and allocating a second memory block on the second memory device for swapping memory pages of the virtual machine.

6. The method of claim 1, wherein the memory device is provided by one of: a file or a raw storage device.

7. The method of claim 1, wherein the memory device is provided by one of: a compressed storage device, an encrypted storage device, or a huge page device.

8. The method of claim 1, further comprising:
identifying an uncompressed memory device responsive to determining that the workload is associated with at least one of: video stream data or audio stream data.

9. The method of claim 1, further comprising:
identifying a compressed memory device responsive to determining that the workload is associated with uncompressed data.

10. The method of claim 1, further comprising:
identifying an encrypted memory device responsive to determining that the workload is associated with security-sensitive data.

11. The method of claim 1, further comprising:
identifying a huge page memory device responsive to determining that the workload is associated with huge page memory pages.

12. A computer system comprising:
a memory; and
a processing device, operatively coupled to the memory, to:
determine a workload type associated with a workload being executed by a virtual machine running on the computer system;
identify, using a memory data structure comprising a plurality of records mapping memory device type identifiers to workload type identifiers, a memory device type associated with the workload type;
identify a memory device associated with the memory device type;
evaluate a memory pressure metric reflecting a period of time during which an application being executed by the computer system has been blocked by a memory allocation operation;
responsive to determining that the memory pressure metric exceeds a threshold value, allocate a memory block on the identified memory device; and
swap memory pages of the virtual machine with the allocated memory block.

13. The system of claim 12, wherein the memory device is provided by one of: a compressed storage device, an encrypted storage device, or a huge page device.

14. The system of claim 12, wherein the workload comprises an application being executed by the virtual machine.

15. The system of claim 12, wherein the processing device is further to:

identify an uncompressed memory device responsive to determining that the workload is associated with at least one of: video stream data or audio stream data.

16. A computer-readable non-transitory storage medium comprising executable instructions that, when executed by a processing device, cause the processing device to:
determine a workload type associated with a workload being executed by a virtual machine running on a computer system;
identify, by the processing device, using a memory data structure comprising a plurality of records mapping memory device type identifiers to workload type identifiers, a memory device type associated with the workload type;
identify, by the processing device, a memory device associated with the memory device type;
evaluate a memory pressure metric reflecting a period of time during which an application being executed by the computer system has been blocked by a memory allocation operation; and
responsive to determining that the memory pressure metric exceeds a threshold value, allocate a memory block on the identified memory device; and
swap memory pages of the virtual machine with the allocated memory block.

17. The computer-readable non-transitory storage medium of claim 16, further comprising executable instructions causing the processing device to:
identify a second computer system associated with the memory device; and
cause the virtual machine to be migrated to the second computer system.

18. The computer-readable non-transitory storage medium of claim 16, further comprising executable instructions causing the processing device to:
responsive to determining that the workload type has changed to a second workload type, identify a second memory device associated with the second workload type; and
allocate a second memory block on the second memory device for swapping memory pages of the virtual machine.

19. The computer-readable non-transitory storage medium of claim 16, wherein the memory device is provided by one of: a compressed storage device, an encrypted storage device, or a huge page device.

20. The computer-readable non-transitory storage medium of claim 16, further comprising executable instructions causing the processing device to:
identify a compressed memory device responsive to determining that the workload is associated with uncompressed data.

* * * * *